US012227392B2

(12) United States Patent
Jamieson

(10) Patent No.: US 12,227,392 B2
(45) Date of Patent: Feb. 18, 2025

(54) SYSTEM AND METHOD FOR CONTROLLING THE LIFTING AND HANDLING OF A LOAD

(71) Applicant: HELMERICH & PAYNE TECHNOLOGIES UK LIMITED, Inverness (GB)

(72) Inventor: Angus Lamberton Jamieson, Inverness (GB)

(73) Assignee: HELMERICH & PAYNE TECHNOLOGIES UK LIMITED, Inverness (GB)

( * ) Notice: Subject to any disclaimer, the term of this patent is extended or adjusted under 35 U.S.C. 154(b) by 0 days.

(21) Appl. No.: 18/403,513

(22) Filed: Jan. 3, 2024

(65) Prior Publication Data

US 2024/0217780 A1 Jul. 4, 2024

Related U.S. Application Data

(63) Continuation of application No. 18/178,698, filed on Mar. 6, 2023, now Pat. No. 11,897,732, which is a (Continued)

(30) Foreign Application Priority Data

Sep. 24, 2019 (GB) ..................................... 1913783

(51) Int. Cl.
*B66C 1/10* (2006.01)

(52) U.S. Cl.
CPC ..................................... *B66C 1/10* (2013.01)

(58) Field of Classification Search
CPC ....... B66C 1/10; B66C 15/08; B66C 15/0491; B66C 15/0425; B25J 15/08; B25J 15/0425

(Continued)

(56) References Cited

U.S. PATENT DOCUMENTS

| | | | |
|---|---|---|---|
| 1,425,525 | A | 8/1922 | Hollick |
| 1,506,827 | A | 9/1924 | Gellert |

(Continued)

FOREIGN PATENT DOCUMENTS

| | | | |
|---|---|---|---|
| CN | 102070075 | A | 5/2011 |
| CN | 203187291 | U | 9/2013 |

(Continued)

OTHER PUBLICATIONS

EP23182887.2, "Office Action", May 29, 2024, 6 pages.

(Continued)

*Primary Examiner* — Paul T Chin

(74) *Attorney, Agent, or Firm* — Kilpatrick Townsend & Stockton LLP

(57) ABSTRACT

Described is a system for connecting a lifting device to a load to be lifted. The system includes a first connector member and a second connector member. The first connector member includes at least one pin. The second connector member includes an indexer mechanism defining a track that includes at least one track opening. At least a portion of the second connector is receivable in at least a portion of the first connector. At least a portion of the at least one pin is receivable in the track via the at least one track opening. The first connector member is reversibly coupleable to the second connector member via the pin and the indexer mechanism in response to a first series of longitudinal movements of the first or second connector members.

21 Claims, 14 Drawing Sheets

Related U.S. Application Data continuation of application No. 17/663,818, filed on May 17, 2022, now Pat. No. 11,618,653, which is a continuation of application No. 17/030,613, filed on Sep. 24, 2020, now Pat. No. 11,358,838.

(58) Field of Classification Search
USPC ................................ 294/192, 193, 95, 110.2
See application file for complete search history.

(56) References Cited

U.S. PATENT DOCUMENTS

| | | | | |
|---|---|---|---|---|
| 1,839,389 | A | | 1/1932 | Heppenstall |
| 3,199,911 | A | | 8/1965 | Alliot et al. |
| 3,388,942 | A | | 6/1968 | Johnsson et al. |
| 3,485,388 | A | | 12/1969 | Bohne |
| 4,147,589 | A | * | 4/1979 | Roman .................... G21C 7/12 376/233 |
| 4,666,200 | A | * | 5/1987 | Walker ................. G21C 19/115 976/DIG. 254 |
| 5,236,239 | A | | 8/1993 | Govang et al. |
| 5,797,639 | A | | 8/1998 | Zorzenon |
| 5,865,491 | A | | 2/1999 | Lee |
| 5,979,961 | A | | 11/1999 | Carey |
| 6,695,372 | B2 | | 2/2004 | Parker |
| 7,490,882 | B2 | | 2/2009 | Nguyen et al. |
| 9,169,863 | B2 | | 10/2015 | Seshachalam et al. |
| 9,902,574 | B1 | | 2/2018 | Nguyen |
| 9,908,748 | B1 | | 3/2018 | Nguyen |
| 10,100,901 | B1 | | 10/2018 | Nguyen |
| D852,602 | S | | 7/2019 | Nguyen |
| 10,633,224 | B2 | | 4/2020 | Nguyen |
| 10,676,944 | B2 | | 6/2020 | Nguyen |
| D893,971 | S | | 8/2020 | Nguyen |
| D894,708 | S | | 9/2020 | Nguyen |
| 10,773,465 | B1 | | 9/2020 | Nguyen |
| 11,358,838 | B2 | | 6/2022 | Jamieson |
| 11,618,653 | B2 | | 4/2023 | Jamieson |
| 2003/0145442 | A1 | | 8/2003 | Hoshino |
| 2008/0085177 | A1 | | 4/2008 | Waisanen |
| 2008/0197646 | A1 | | 8/2008 | Anda |
| 2011/0089709 | A1 | | 4/2011 | Neeper |
| 2013/0336755 | A1 | | 12/2013 | Neeper |
| 2014/0353994 | A1 | | 12/2014 | Seshachalam et al. |
| 2016/0090277 | A1 | | 3/2016 | Archer et al. |
| 2016/0208845 | A1 | | 7/2016 | Zivanovic et al. |
| 2017/0106502 | A1 | | 4/2017 | Sakatani |
| 2020/0109034 | A1 | | 4/2020 | Nguyen |

FOREIGN PATENT DOCUMENTS

| | | | |
|---|---|---|---|
| CN | 106744261 | A | 5/2017 |
| WO | 2014168610 | A1 | 10/2014 |
| WO | 2014184502 | A1 | 11/2014 |
| WO | 2018139931 | A1 | 8/2018 |
| WO | 2019204897 | A1 | 10/2019 |
| WO | 2020003254 | A1 | 1/2020 |

OTHER PUBLICATIONS

U.S. Appl. No. 17/030,613 , "Corrected Notice of Allowability", Apr. 14, 2022, 4 pages.
U.S. Appl. No. 17/030,613 , "Non-Final Office Action", Oct. 5, 2021, 8 pages.
U.S. Appl. No. 17/030,613 , "Notice of Allowance", Feb. 15, 2022, 7 pages.
U.S. Appl. No. 17/663,818 , "Notice of Allowance", Nov. 30, 2022, 9 pages.
U.S. Appl. No. 18/178,698 , "Notice of Allowance", Oct. 5, 2023, 9 pages.
EP Patent Application No. 20785578.4 , "Intention to Grant", Feb. 13, 2023, 9 pages.
EP Patent 23182887.2 , "Extended European Serach Report", Sep. 5, 2023, 6 pages.
International Patent Application No. PCT/GB2020/052327 , "International Search Report and Written Opinion", Jan. 22, 2021, 15 pages.

* cited by examiner

SYSTEM AND METHOD FOR CONTROLLING THE LIFTING AND HANDLING OF A LOAD

CROSS-REFERENCES TO RELATED APPLICATIONS

This application is a continuation of and claims the benefit of priority of U.S. patent application Ser. No. 18/178,698, filed on Mar. 6, 2023, which is a continuation of and claims the benefit of priority from U.S. patent application Ser. No. 17/663,818, filed on May 17, 2022, which is a continuation of and claims the benefit of priority from U.S. patent application Ser. No. 17/030,613, filed on Sep. 24, 2020, which in turn claims the benefit of priority from Great Britain Patent Application No. 1913783.5, filed on Sep. 24, 2019. Each of these applications is hereby incorporated by reference herein in its entirety.

FIELD OF THE INVENTION

The present invention relates to load lifting and positioning systems and in particular a system and method for controlling the connecting of a load to a lifting device and the lifting and handling of a load.

BACKGROUND OF THE INVENTION

Loads can be suspended by forklifts, wheel loader overhead cranes such as boom and jib cranes and many other machines that can lift a load higher than ground level.

Most accidents on onshore and offshore sites are related to load lifting and handling. During connection and disconnection of a load to a lifting apparatus such as a crane, accidents may occur due to external forces such as such as inclement weather. High winds may cause the load to move and change orientation. This can be problematic for crane operators trying to maintain a stable position whilst the load is connected/disconnected to the lifting device.

Current load handling and positioning systems involve ground workers manually connecting the load to the lifting device and dragging the load via the guide ropes into a desired position. This handling operation can be problematic due to the physically demanding nature of the equipment especially when the work is carried out under adverse weather conditions.

Problems can also occur when there is miscommunication between the crane operator and ground workers. Such issues can result in collision of the load with obstacles leading to damage of the load and/or the obstacles and risks to personnel.

Due to the complexity of the handling operation and the safety protocols for the on-site workers, any operation requiring the connection/disconnection and movement of loads must be pre-planned to ensure that at no point a worker is required to work in proximity to the suspended load. This can impose restrictive working conditions when the area to maneuver the load is small.

There is a high risk of serious injury or death if a suspended load should fall during handling operations. Due to the need to securely connect the load to the lifting apparatus and the nature of the use of guide ropes to orient the load, the workers are required to be in close proximity of the load and are therefore at an increased risk of danger. The level of danger increases as the weight and size of the load increases.

SUMMARY OF THE INVENTION

It is the object of some aspects of the present invention to obviate or at least mitigate the foregoing disadvantages of prior art load handling systems.

It is an object of some aspects of the present invention to provide a system which is designed for easy and rapid connection and disconnection of a load to and from a lifting device.

It is another object of some aspects of the present invention to provide a system configured to enable a crane operator to remotely connect and disconnect a lifting device to a load and accurately control the positioning of a load and to allow the crane operator to maintain full control of the orientation of the load.

A further object of some aspects of the present invention is to reduce the risk of injury to on-site workers who work in close proximity to the load handling apparatus. Further aims of certain aspects of the present invention will become apparent from the following description.

According to certain aspects of the present invention, there is provided a system for connecting a lifting device to a load to be lifted; the system comprising:

- a first connector member connectable to a load to be lifted;
- a second connector member connectable to a lifting device;
- at least a portion of the second connector is configured to be received in at least a portion of the first connector;
- wherein the first connector member is configured to reversibly couple to the second connector member in response to a first series of longitudinal movements of the first or second connector members.

The first connector member may comprise a first latch member and the second connector may comprise a second latch member. The first latch member and the second latch member may be configured to reversibly couple in response to a first series of longitudinal movements of the first connector member. The first latch member and the second latch member may be configured to reversibly couple in response to a first series of longitudinal movements of the second connector member.

The first latch member may be a pin or stud and the second latch member may be an indexer mechanism or indexer sleeve. The indexer mechanism may be configured to receive the at least one pin or stud. The first latch member may be an indexer mechanism or indexer sleeve and the second latch member may be a pin or stud.

The first connector member may comprise a body or frame. The first latch member may be located on an inner surface of the body or frame. The second latch member may be located on an outer surface of a body or frame of the second connector member.

The first connector member may be configured to reversibly de-couple or disconnect from the second connector member in response to a second series of longitudinal movements of the first or second connector member. The second series of longitudinal movements may be a repetition of the first series of longitudinal movements.

The series of longitudinal movements may be a predetermined sequence of downward and upward longitudinal movements of the first connector member relative to the second connector member. The series of longitudinal movements may be a predetermined sequence of downward and upward longitudinal movements of the second connector member relative to the first connector member. The series of longitudinal movements may be vertical lifts or drops of the second connector member.

A first series of longitudinal movements of the first connector member may move the pin or stud to a lock position in the indexer mechanism or indexer sleeve. A second series of longitudinal movements of the first connector member may move the pin or stud to an unlock position in the indexer mechanism or indexer sleeve.

The above-described system may facilitate the remote connection and/or disconnection of a lifting device to a load to be lifted. The system may allow the user to maintain full control of the connection, lifting, orientation, and/or disconnection of the load without the need of workers to manually connect, lift, orientate, and/or disconnect the load.

The system may prevent injury to workers as the connection, lifting, orientation, and/or disconnection of the load can be controlled and effected remotely. In the unlikely event of damage or failure of an element of the system, it would likely not result in serious injuries as no personnel would be in the vicinity of the load.

The system may be controllable from a remote position. The second connector member may be remotely moved in a first series of longitudinal movements to couple or connect the first connector member to the second connector member. The second connector member may be remotely moved in a second series of longitudinal movements to de-couple or disconnect the first connector member from the second connector member.

The first connector member may comprise a torque ring. The torque ring may be described in a shape in a plane in which it is oriented. The shape may be substantially circular, elliptical, oval or polygon such as triangular, square, rectangular, pentagonal, hexagonal. In some embodiments, the shape of the torque is circular.

The torque ring may have a plurality of teeth arranged on its inner surface. The plurality of teeth may be machine formed on the inside diameter of the torque ring.

The dimensions of the torque ring may vary depending on the dimensions of the suspended load. In some embodiments, the torque ring has a diameter of 400 mm.

By providing a torque ring, external forces such as torque may be transmitted from the lifting device to the load and vice versa with minimal torque force being transferred through the latching mechanism and therefore may mitigate accidental release of the load from the lifting device.

The second connector member may comprise at least one fin configured to engage the teeth of the torque ring. The at least one fin may be configured to transmit torque from the second connector member to the teeth on the torque ring and to the first connector. The plurality of teeth on the torque ring may be configured to transmit torque from the first connector member to the fins on the second connector.

Providing a torque ring with multiple teeth may allow small degrees of torque to be accurately transmitted to and from the load during handling.

The second connector member may comprise a first and second section. The second latch member may be located on the first section. The at least one fin may be located on the second section. The first section and second section may be configured to rotate independently from one another in a first condition. The first section and second section may be rotational coupled in a second condition. The first condition may be when no upward lifting force is applied to the second connector member. The second condition may be when an upward lifting force is applied to the second connector member.

The second connector may comprise a clutch mechanism movable between the first condition in which the first and second sections are configured to rotate independently from one another and a second condition in which the first and second sections are rotationally coupled.

The first connector member may comprise a funnel configured to guide or direct the second connector member into at least a portion of the first connector member. The first connector member may comprise a funnel-shaped aperture configured to guide or direct the second connector member toward into at least a portion of the first connector member.

The first connector member may have at least one lug or eyelet to connect the first connector member to the load. The second connector member may have at least one lug or eyelet to connect the second connector member to the lifting device. The lifting device may be a crane, derrick, or similar lifting gear.

According to certain aspects of the present invention, there is provided a system for connecting a lifting device to a load to be lifted; the system comprising:

- a first connector member connectable to a load to be lifted;
- a second connector member connectable to a lifting device;
- the first connector comprising a first latch member and the second connector comprising a second latch member;
- wherein the first latch member and the second latch member are configured to reversibly couple in response to a first series of longitudinal movements of the first connector member.

Embodiments of these aspects of the invention may include one or more features of the previous aspects of the invention or its embodiments, or vice versa.

According to certain aspects of the present invention, there is provided a system for lifting a load comprising:

- a first connector member connectable to a load to be lifted;
- a second connector member comprising a first section and a second section;
- the first section is connectable to a lifting device and the second section comprises a latching mechanism configured to reversibly couple to the first connector member;
- wherein the latching mechanism is configured to reversibly couple the first connector member and the second connector member in response to a sequence of longitudinal movements of the second connector member.

The second connector member may comprise a clutch mechanism movable between a first condition in which the first and second sections are configured to rotate independently from one another and a second condition in which the first and second sections are rotationally coupled.

The above-described system may facilitate the remote connection and disconnection of a lifting device to a load to be lifted. This system may allow the second section to rotate independently from the first section such that latching mechanism may be moved to the lock position to latch the first connector member and second connectors. Once the latch mechanism has locked, the clutch mechanism may be moved to the second position to rotationally couple the first and second sections to allow the effective transfer of torque after the first connector member and second connector members have been latched.

The system may prevent injury to workers as the connection, lifting, orientation, and/or disconnection of the load can be controlled and effected remotely. In the unlikely event of damage or failure of an element of the system, it would likely not result in serious injuries as no personnel would be in the vicinity of the load.

Embodiments of these aspects of the invention may include one or more features of the previous aspects of the invention or its embodiments, or vice versa According to certain aspects of the present invention, there is provided a method of connecting a load to a lifting device, the method comprising:

- providing a load lifting system, the system comprising
- a first connector member;
- a second connector member;
- connecting the first connector member to the load to be lifted;
- connecting the second connector member to the lifting device;
- lowering a portion of the second connector member into or around at least a portion of the first connector member;
- moving the second connector member in a first series of longitudinal movements relative to the first connector member to reversibly couple the first connector member and the second connector member.

The method may comprise decoupling or disconnecting the first connector member and the second connector member by moving the second connector member in a second series of longitudinal movements relative to the first connector member.

Embodiments of these aspects of the invention may include one or more features of the previous aspects of the invention or its embodiments, or vice versa.

According to certain aspects of the present invention, there is provided a method for connecting a lifting device to a load to be lifted; the method comprising:

- providing a load lifting system, the system comprising
- a first connector member connectable to a load to be lifted;
- a second connector member connectable to a lifting device;
- the first connector member comprising a first latch member and the second connector member comprising a second latch member; and
- moving the second connector member in a series of longitudinal movements relative to the first connector member to reversibly couple the first latch member to the second latch member.

The method may comprise lowering at least a portion of the second connector into at least a portion of the first connector. The method may comprise operating the lifting device to move the second connector member in a series of longitudinal movements.

The series of longitudinal movements may be a predetermined sequence of downward and upward longitudinal movements of the second connector member relative to the first connector member.

The method may comprise longitudinal movements of the second connector member to position a pin or stud located on the first connecter member in a track of an indexer mechanism located on the second connector member. The method may comprise moving the second connector member until the pin or stud is located in a load bearing slot in the indexer mechanism.

The second connector member may comprise a first section and a second section. The first section may be connectable to the lifting device and the second section may be configured to reversibly couple to the first connector member. The first and second sections may be configured to rotate independently from one another in a first condition and configured to be rotationally coupled in a second condition. The method may comprise connecting the second section to the first connector member in a first condition. The method may comprise moving the second connector member in a sequence of longitudinal movements to latch the first connector member and the second connector member. The method may comprise moving first and second sections to the second condition by applying a lifting force to the second connector member.

Embodiments of these aspects of the invention may include one or more features of any of the previous aspects of the invention or its embodiments, or vice versa.

According to certain aspects of the present invention, there is provided a method of remotely connecting lifting device to a load, the method comprising:

- providing a lifting device and load lifting system, the system comprising
- a first connector member connectable to a load to be lifted;
- a second connector member connectable to a lifting device;
- the first connector member comprising a first latch member and the second connector member comprising a second latch member; and
- lifting the second connector member in a predetermined sequence of movements relative to the first connector member to reversibly couple the first latch member to the second latch member.

The method may comprise moving the second connector member in a series of longitudinal movements relative to the first connector member whilst the load is supported on the ground and no lifting force is applied to the load. The method may comprise de-coupling the first latch member from the second latch member by supporting the load on a surface and moving the second connector member in a second series of longitudinal movements relative to the first connector member.

The method may comprise disconnecting the lifting device from a load by moving the second connector member in a series of longitudinal movements relative to the first connector member whilst no lifting force is applied to the load.

Embodiments of these aspects of the invention may include one or more features of any of the previous aspects of the invention or its embodiments, or vice versa.

According to certain aspects of the present invention, there is provided a method of lifting load, the method comprising:

- providing a load lifting system, the system comprising
- a first connector member;
- a second connector member comprising a first section and a second section;
- the first section is connectable to a lifting device and the second section is configured to reversibly couple to the first connector member;
- wherein the first and second sections are configured to rotate independently from one another in a first condition and configured to be rotationally coupled in a second condition;
- connecting the first connector member to the load to be lifted;
- connecting the first section of the second connector member to the lifting device; and
- connecting the second section to the first connector member in a first condition;

moving the second connector member in a sequence of lifting movements to latch the first connector member and the second connector member; and moving the first and second sections to the second condition by apply a lifting force to the second connector member.

The method may comprise transferring torque from the load to the lifting device. The method may comprise transferring torque from the first connector member to the first section.

The method may comprise transferring torque from the load to the connected torque ring of the first connector member, the torque ring subsequently acting on the first section of the second connector to transfer the torque to the lifting device.

The method may comprise transferring torque from the lifting device to the load. The method may comprise transferring torque from the first section to the first connector member. The method may comprise transferring torque from the lifting device or a torque generating device to the connected first section and to a torque ring of the first connector member to the connected load.

Embodiments of these aspects of the invention may include one or more features of any of the previous aspects of the invention or its embodiments, or vice versa.

According to certain aspects of the present invention, there is provided a load lifting system for a crane, the load lifting system comprising the load connection system according to the previous aspects of the invention.

Embodiments of these aspects of the invention may include one or more features of any of the previous aspects of the invention or its embodiments, or vice versa.

BRIEF DESCRIPTION OF THE DRAWINGS

There will now be described, by way of example only, embodiments of the invention with reference to the drawings, of which.

DETAILED DESCRIPTION OF THE INVENTION

Figure 1B:
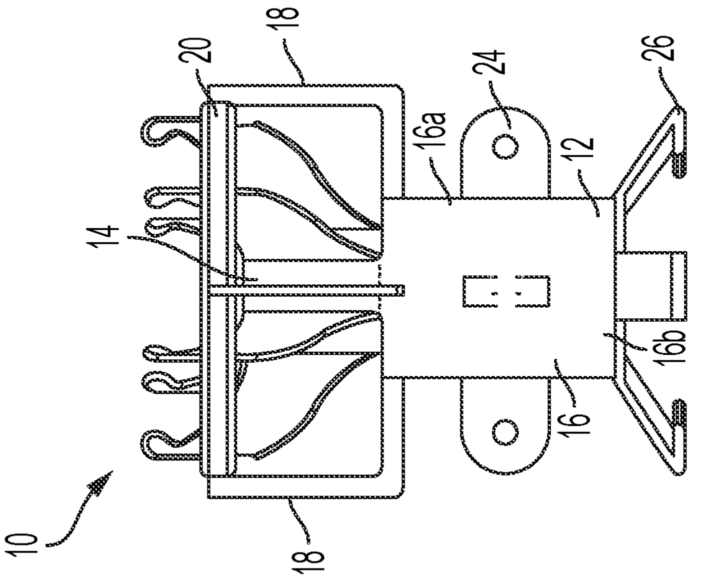
FIG. 1B is a side view of the lifting system of FIG. 1A.
Figure 1A:
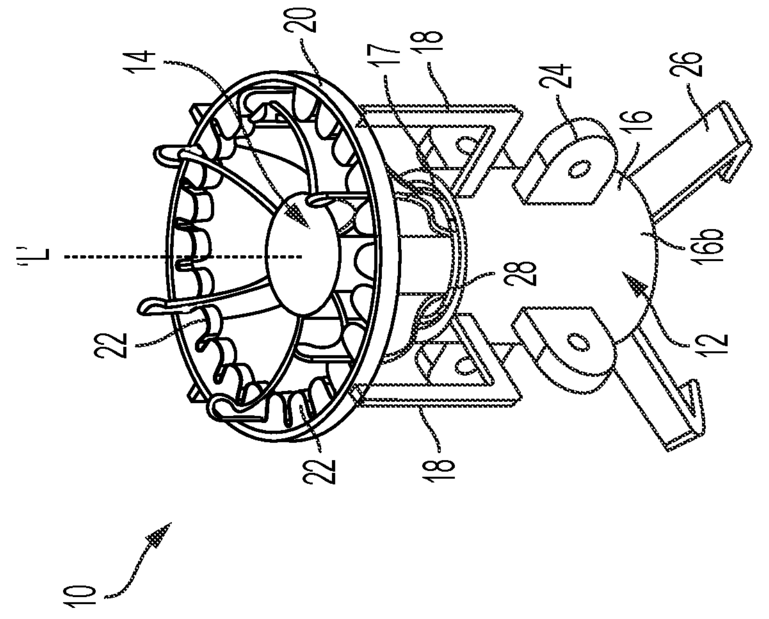
FIG. 1A is a perspective view of a lifting system, according to certain embodiments of the present invention.
Figure 1C:
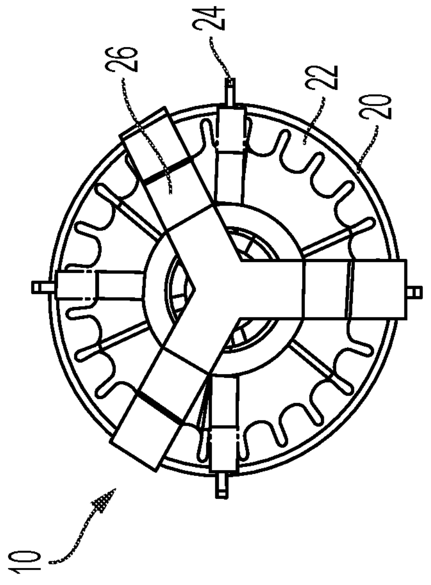
FIG. 1C is a top view of the lifting system of FIG. 1A.
Figure 1D:
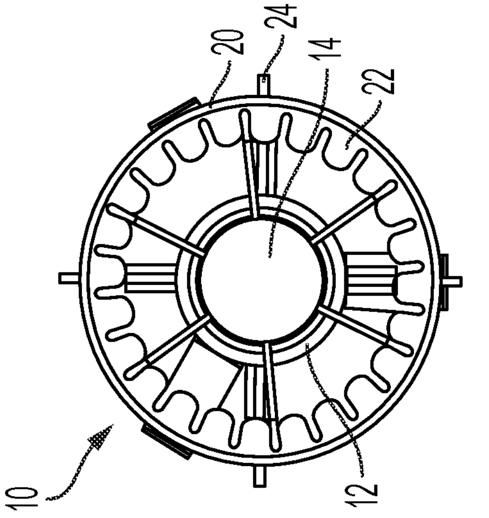
FIG. 1D is a bottom view of the lifting system of FIG. 1A.

Referring firstly to FIGS. 1A to 1D, there is shown generally depicted at 10, a lifting system. The system 10 comprises a first connector member namely a load connector apparatus 12 and a second connector member namely a lift connector apparatus 14. In FIG. 1A the load connector apparatus 12 and a lift connector apparatus 14 are shown in a coupled condition to allow a load (not shown) attached to the load connector apparatus 12 to be connected to a lifting device (not shown) attached via the lift connector apparatus 14.

The load connector apparatus 12 has a generally cylindrical body 16 which forms a chamber 17 to receive a portion of the lift connector apparatus 14. The body 16 has a plurality of arms 18 which extend from an upper end 16*a* of the body 16 around its circumference and provide support to a torque ring 20. In some examples, four arms support the torque ring 20. However, it will be appreciated that different number of arms or arm designs may be used to support the torque ring 20.

As best shown in 2A and 2B, the torque ring 20 has a plurality of teeth 22 on the inner surface of the ring 20 designed to engage the lift connector apparatus 14. In some examples, the ring has a diameter of 400 mm ring with teeth 22 having a rounded shape or profile. However, it will be appreciated that a variety of teeth designs, a different number of teeth and ring diameters may be used.

FIGS. 3A to 3D shows the features of the load connector apparatus with the lift connector apparatus 14 removed for clarity. The body 16 has a number of eyelets 24 which extend from the body 16 around its circumference to enable the load connector apparatus to be connected to a load via slings (not shown). The load connector apparatus 12 has three legs 26 located at the base 16*b* of the load connector apparatus 12 to be lifted. The body 16 has a bore 28 or central passage with studs 30 projecting from the inner surface 28*a* of the bore 28 into the bore 28. The studs are designed to engage a latch mechanism on the lift connector apparatus 14 discussed further in relation to FIGS. 4A to 4D.

Figure 3A:
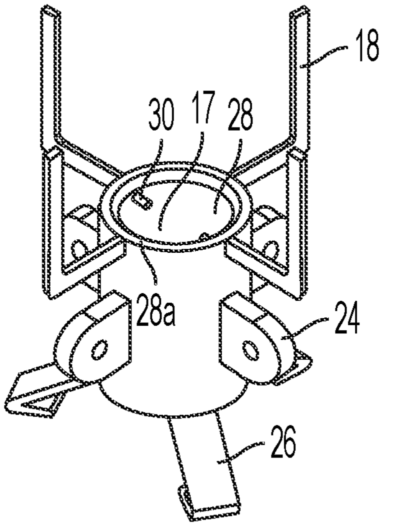
FIG. 3A is a perspective view of the load connector apparatus of the lifting system of FIG. 1A with the torque ring removed for clarity.
Figure 3B:
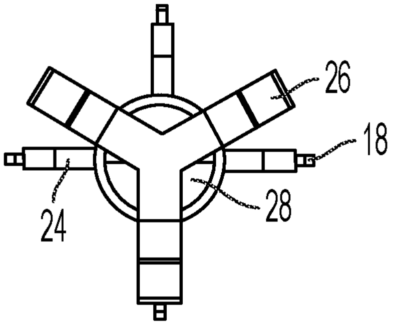
FIG. 3B is a top view of the load connector apparatus of FIG. 3A.
Figure 3C:
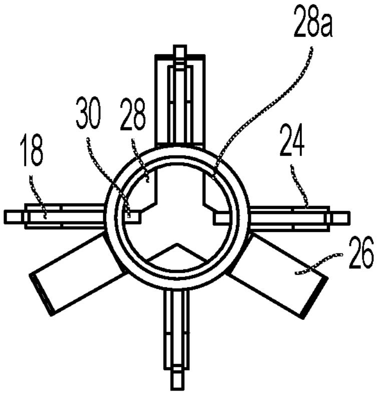
FIG. 3C is a bottom view of the load connector apparatus of FIG. 3A.
Figure 3D:
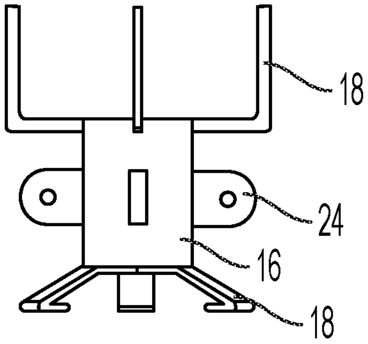
FIG. 3D is a side view of the load connector apparatus of FIG. 3A.

The three legs arrangement shown in FIG. 3A ensures that all legs are touching the ground or load providing stability even if the apparatus is located on an uneven ground or load. However, it will be appreciated that a different number of legs may be used.

FIGS. 4A to 4D show a lift connector apparatus 14 having a body 32. The body 32 has an upper section 32*a* and a lower section 32*b*. A lower end 31 of the lower section 32*b* has a generally semi-spherical shape which aids in guiding the lift connector apparatus into the bore 28 of the load connector apparatus 12. It will be appreciated that the lower end 31 may alternatively have a pointed or cone-shape to reduce the likelihood of the lift connector apparatus 14 being stuck as it enters the bore of the load connector apparatus 12.

The upper section 32*a* of the body 32 has a plurality of fins members 34 projecting outward from the outer surface 32*c* of the upper section 32*a*. In some embodiments, six fin members 34 are arranged around the circumference of the outer surface 32*c* of the upper section 32*a*.

The lower section 32*b* has an indexer sleeve or mechanism 40 comprising a circumferential track 42 on its outer surface. The dimensions of the track are designed to accommodate the studs 30 on the load connector apparatus 12.

Together the indexer mechanism or sleeve and the studs act as a latching mechanism to couple the lift connector apparatus and the load connector apparatus.

Figure 4B:
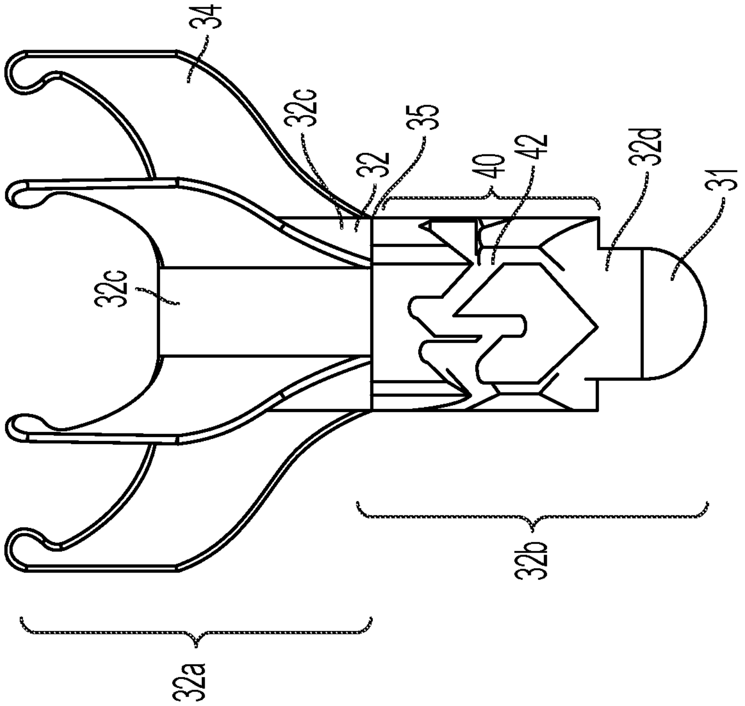
FIG. 4B is a side view of the load connector apparatus of FIG. 4A
Figure 4A:
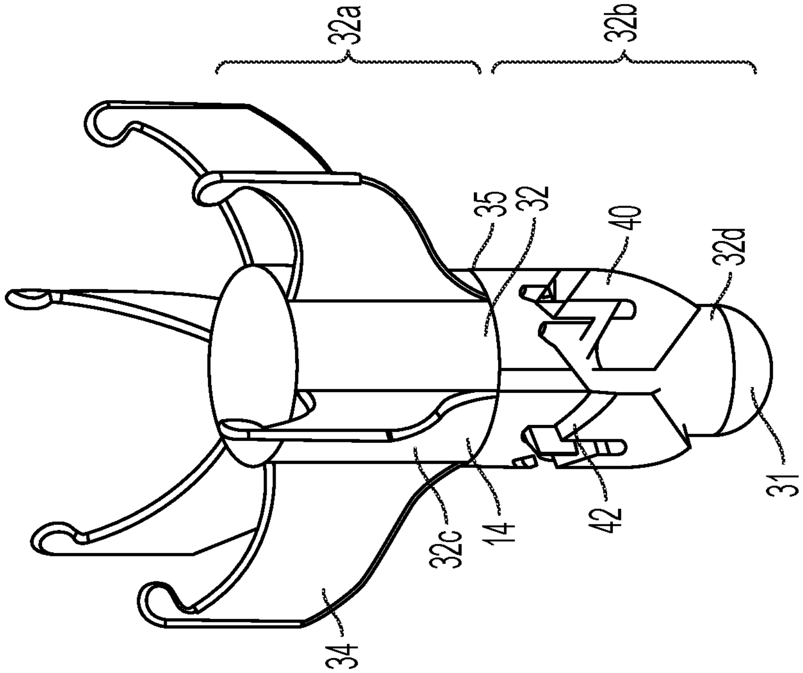
FIG. 4A is a perspective view of the load connector apparatus of the lifting system of FIG. 1A.
Figure 4C:
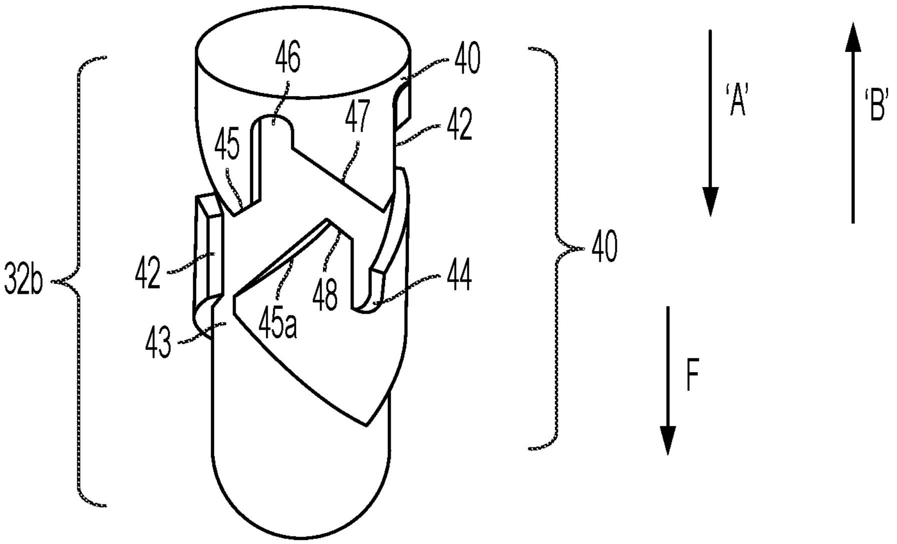
FIG. 4C is a perspective view of the lower section of the lift connector apparatus of FIG. 4A with the upper section removed for clarity.

As best shown in FIGS. 4A to 4C, the indexer mechanism 40 is located on the outer surface 32*d* of the lower section 32*b*. The indexer mechanism 40 may be a sleeve retained on the outer surface 32*d* or is integrated as the part of the lower section 32*b*.

As best shown in FIGS. 4A to 4C, the track 42 in the indexer sleeve 40 has a plurality of stud inlets/outlets 43 and load bearing slots 44 arranged around its circumference. When the studs 30 enter the tracks 42 via the inlet 43 and move to the load bearing slot 44, the lift connector apparatus 14 is locked and coupled to the load connector apparatus 12 which allow the load connector apparatus to be picked up, moved to a desired position and lowered into place. Subsequent movement of the studs from the load bearing slot 44 to the outlet 43 allows the lift connector apparatus 14 to be removed from the load connector apparatus.

Figure 4D:
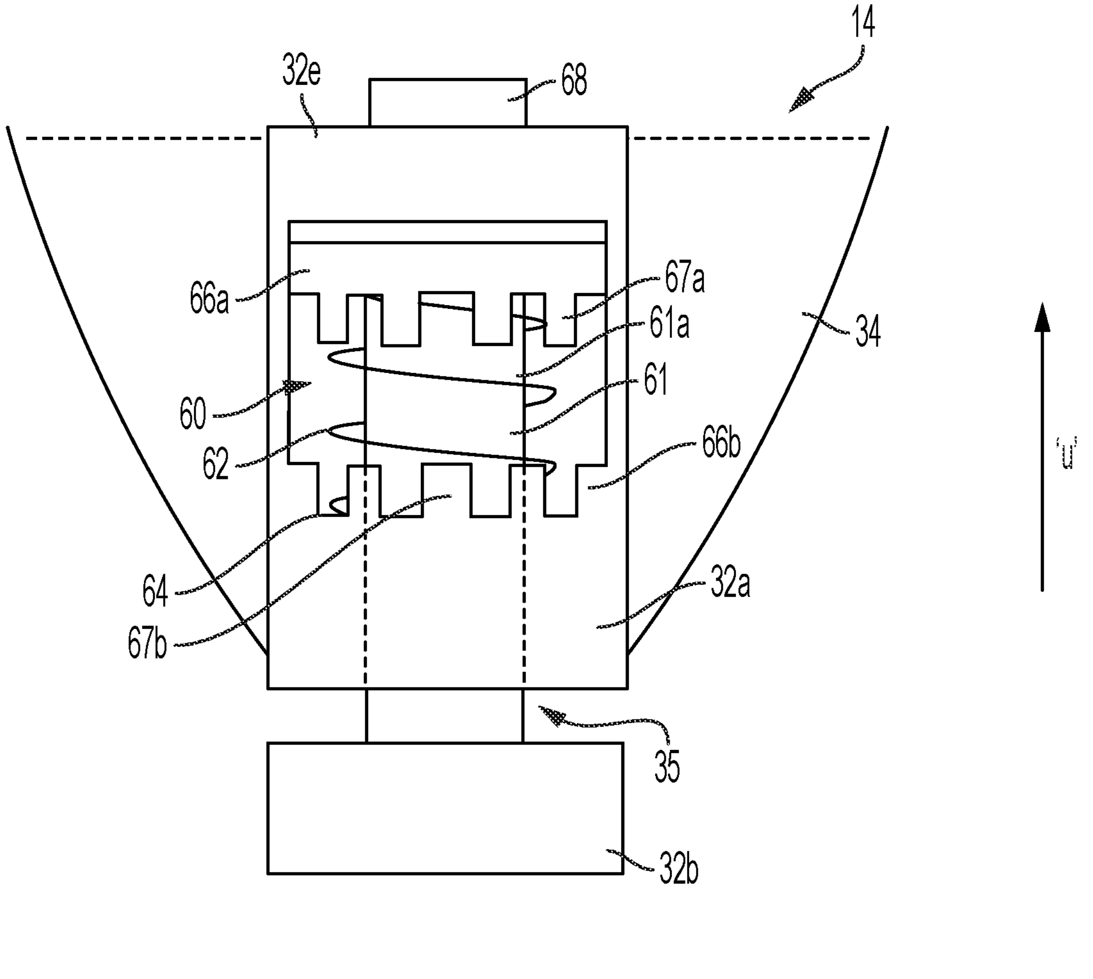
FIG. 4D is a side view of the clutch mechanism of the lift connector apparatus of FIG. 4A.

FIG. 4D shows a schematic of the clutch mechanism located in the lift connector apparatus. The clutch mechanism 60 is located between the upper section 32*a* and the lower section 32*b*. The lower section 32*b* has a shaft 61 around which the upper section 32*a* is mounted. At an upper end 61*a* of the shaft 61 is an upper clutch member 66*a* which has a set of square jaw teeth 67*a*. The upper clutch member 66*a* is designed to engage a lower clutch member 66*b* which has a corresponding set of square jaw teeth 67*b*. A compression spring 62 is arranged around the shaft 61 and holds the clutch mechanism in an open clutch condition as shown in FIG. 4D where the upper clutch member 66*a* is axial spaced apart from the lower clutch member 66*b*.

In a first clutch position shown in FIG. 4D, the upper section is free to rotate about shaft 61. The upper and lower sections may rotate independently from one another.

An upper surface 32*e* of the lift connector apparatus 14 has an eyelet 68 designed to be coupled to a crane (not shown). The lift connector apparatus has a bearing surface 35 between the upper section 32*a* and lower section 32*b* which allows the upper section 32*a* rotate independently to the lower section 32*b* about shaft 61.

When an upper force in the direction shown as arrow "U" in FIG. 4D is applied by the crane on the lift connector apparatus, the upper section 32*a* is moved upwards in the direction shown as arrow "U", which brings the teeth 67*b* of the lower clutch member 66*b* in contact with the teeth 67*a* of the upper clutch member 66*a* where they mesh. The clutch mechanism is then in a closed clutch condition and the upper section 32*a* and the lower section 32*b* of the lift connector apparatus are rotationally coupled.

In use, the load connector apparatus 12 is connected to a load to be moved via slings attached to lifting eyelets 24. The lift connector apparatus 14 is connected to a lifting device such as a crane by eyelet 68 on the upper section 32*a*.

The crane operator maneuvers a lifting hook connected to the lift connector apparatus such that the lower end 31 passes through the torque ring 20 and enters the bore 28 of the load connector apparatus 12. The torque ring 20 creates a target for the crane operator to aim for with the lift connector apparatus 14.

As the lift connector apparatus 14 is lowered into the bore 28 of the load connector apparatus 14, the fins 44 engage the grooves 22*a* between the teeth 22 on the torque ring which assists in guiding the lift connector apparatus 12 into the correct operational position and aids the indexer mechanism on the lift connector apparatus 14 to approach the studs 30 on the inner surface of the bore 28 in the correct orientation. The teeth 22 on the torque ring keep the lift connector apparatus 12 in a substantial vertical orientation which assist the studs 30 to connect with the indexer mechanism 40. The rounded profile of the teeth 22 assist in the fins 44 locating the grooves 22*a*. Relative movement of the lift connector apparatus 14 relative to the load connector apparatus 12 determines which track in the indexer mechanism the studs enter.

Under the effects of gravity, the weight of the lift connector apparatus 14 moves the lift connector apparatus in a downward direction shown as arrow "A" in FIG. 4C until the studs 30 located on the inner surface 28*a* of the bore 28 of the load connector apparatus 12 enter the track inlets 43 in the indexer mechanism 40.

Under the weight of the lift connector apparatus 14, the studs 30 travel along track 45*a* in the indexer mechanism 40 and contact inclined shoulder 45 in the track, and the studs 30 are directed into upper slot 46. This action rotates the lower section 32*a* of the lift connector apparatus 14 relative to the upper section 32*b*. As the clutch mechanism 60 is in the open clutch condition the upper section 32*a* and lower section 32*b* are free to rotate independently of one another.

When the studs 30 are in the upper slot 46 of the indexer mechanism, the lift connector apparatus 14 cannot be lowered any further in direction "A". The crane operator moves the lift connector apparatus 14 in a predetermined sequence of longitudinal movements. In this case it is moved in an upward direction shown as arrow "B" in FIG. 4C. This upward movement or jolt results in the stud 30 travelling along track 47 in the indexer mechanism 40 and contacting inclined shoulder 48 in the track which directs the stud 30 into load bearing slot 44. When the studs 30 are located in the load bearing slots 44 they are constrained against rotation by shoulders 49 and 50 and the downward force "F" acting on the studs by the load. The lift connector apparatus 14 and load connector apparatus 12 are reversibly coupled together as shown in FIG. 1A.

As the indexer mechanism 40 of the lower section of the lift connector apparatus is maneuvered to position the studs 30 in load bearing slot 44, the fins 34 on the upper section are positioned in grooves 22 between teeth 22 on the torque ring 20. The lower section 32*b* is able to rotate about the longitudinal axis relative to the upper section by bearing 35.

When the studs 30 are positioned in load bearing slot 44 the fins 34 are securely positioned in grooves 22*a* between teeth 22 on the torque ring 20. The grooves between the teeth rotationally couple the fins, the upper section 32*a*, and the torque ring.

A further lifting force is applied by the crane shown as arrow "B" in FIG. 4C to overcome the spring force of the compression spring 62 in the clutch mechanism 60. The spring force may be calibrated based on the load to accurately control the activation of the clutch.

The upper section 32*a* is moved upwards in the direction shown as arrow "U" in FIG. 4D, this brings the teeth 67*b* of the lower clutch member 66*b* in contact with the teeth 67*a* of the upper clutch member 66*a* where they mesh. The clutch mechanism is moved to a closed clutch condition and the upper section 32*a* and the lower section 32*b* of the lift connector apparatus are rotationally coupled.

During a lifting operation any rotational torque applied to the lifting hook about the longitudinal axis "L" as shown in FIG. 1A is transferred through the upper section 32*a* of the lift connector apparatus through the fins 34 to the teeth 22 of torque ring 20 and applied to the load. The teeth on the inside of the torque ring transfer the torque from the fins to torque ring and to the load via the slings. This allows even the smallest degree of rotation applied by the lifting device to be transfer to the load ensuring accurate positioning of the load. As the torque is substantially applied to the torque ring minimal torque may be transferred or applied to the indexer mechanism which avoids damage to the studs or accidental release of studs from the indexer mechanism.

Also during a lifting operation any rotational torque applied to the load about the longitudinal axis "L" as shown in FIG. 1A is transferred through load connector apparatus to the torque ring 20 and via the torque ring teeth 22 to the fins 34 of the upper section of the lift connector apparatus. This allows torque acting on the load to be accurately and effectively transferred to the lifting apparatus.

This enables the lift connector apparatus upper section 32*a* and fin members 34 to transfer torque to the load connector apparatus 12 safely, securely and accurately.

To disconnect the lift connector apparatus 14 and load connector apparatus 12 the load is lowered to contact the ground or a surface capable of supporting the load. As the downward force provided by the weight of the load is reduced the spring force of the compression spring 62 in the clutch mechanism 60 separates the lower clutch member 66*b* and the upper clutch member 66*a* to move the clutch to an open clutch condition as shown in FIG. 4D. The upper section 32*a* is free to rotate about shaft 61. The upper section 32*a* and lower section 32*b* may rotate independently from one another.

The load force acting on the studs 30 in load bearing slot 44 from the weight of the load is also reduced and further upward movement in direction "B" of the lift connector apparatus 14 results in the studs 30 moving out of the load bearing slot 44. The lower section 32*b* rotates relative to the upper section about longitudinal axis "L" as the studs 30 travel along the track 45*a* to the track outlet 43. The lift connector apparatus 14 is disconnected from the load connector apparatus and may be lifted out of the bore 28.

In some examples, the track mechanism is designed for the sequential lifting or longitudinal movements of a first vertical drop to guide the studs into the track and then a first vertical lift in an upward movement to engage the load bearing slot. However, it will be appreciated that other tracks shapes with different locking and unlocking drop/lift sequences may be used to latch the load connector apparatus and lift connector apparatus.

In alternative embodiments, interlocking teeth may be used which would allow the track to rotate freely to find the studs, while the fins are unable to rotate until the lifting point is found and the lifting connector apparatus is under tension. Then the teeth engage, and the connection becomes rigid allowing torque to be transferred through the lifting connector apparatus.

Although the described embodiments relate to the indexer mechanism being located on an outer surface of the lift connector apparatus and the corresponding studs being located on an inner bore surface of the load connector apparatus, it will be appreciated that the indexer mechanism may be located on an inner surface of the bore of the load connector apparatus and the corresponding studs may be located on an outer surface of the lift connector apparatus.

Figure 5B:
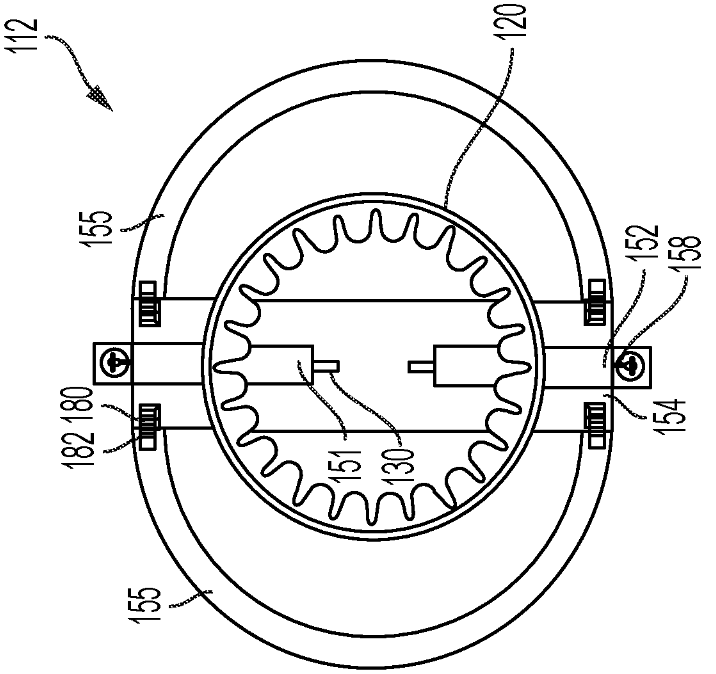
FIG. 5B is a top view of the lifting system of FIG. 5A.
Figure 5A:
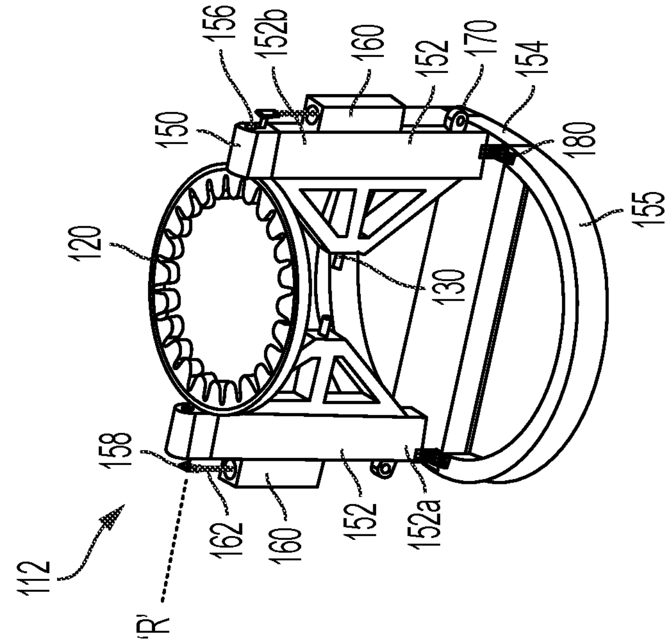
FIG. 5A is a perspective view of a lifting system, according to certain embodiments of the present invention.
Figure 5C:
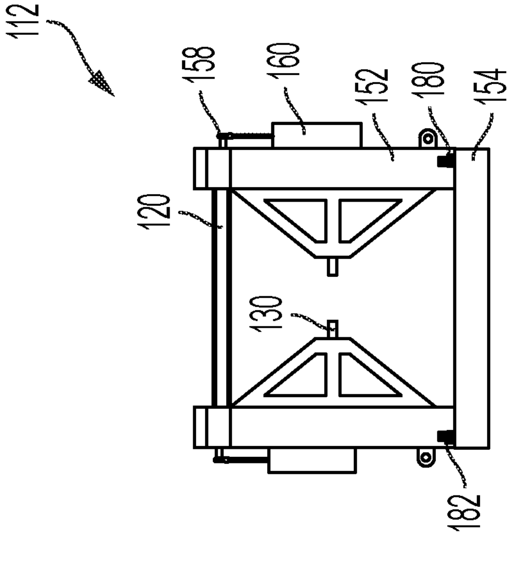
FIG. 5C is a side view of the lifting system of FIG. 5A.
Figure 5D:
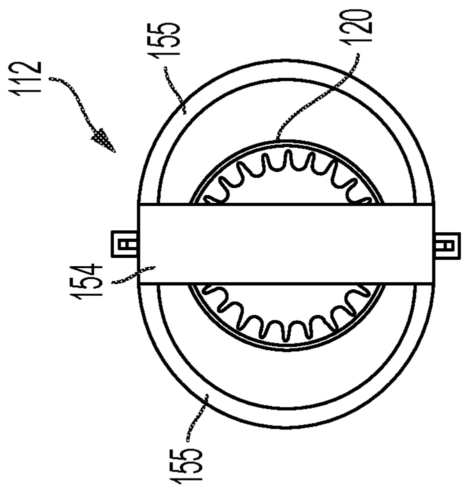
FIG. 5D is a bottom view of the lifting system of FIG. 5A.
Figure 5E:
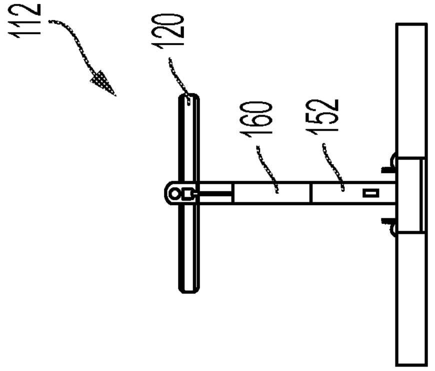
FIG. 5E is a front view of the lifting system of FIG. 5A.
Figure 6A:
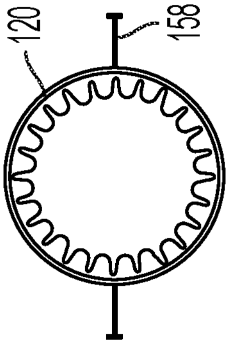
FIG. 6A is a perspective view of a torque ring of the lifting system of FIG. 5A.
Figure 6B:
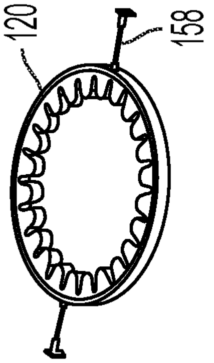
FIG. 6B is a top view of the torque ring of FIG. 6A.
Figure 7A:
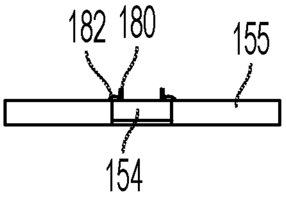
FIG. 7A is a side view of a base section of the lifting system of FIG. 5A in an operational configuration.
Figure 7B:
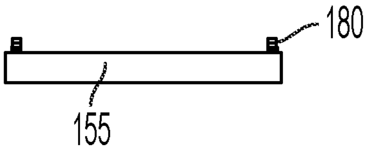
FIG. 7B is a front view of the base section of FIG. 7A.
Figure 7C:
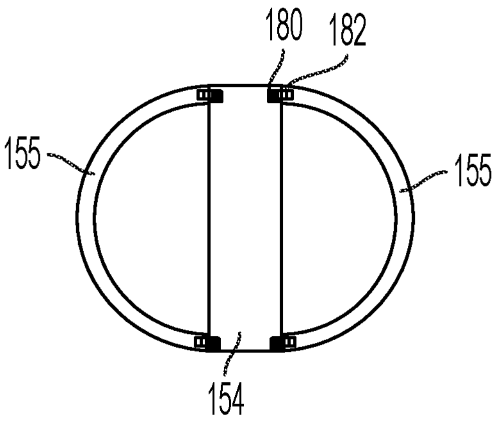
FIG. 7C is a top view of the base section of FIG. 7A.
Figure 7D:
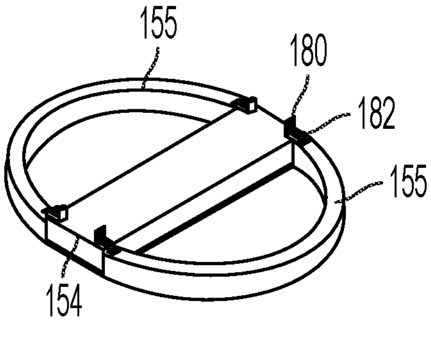
FIG. 7D is a perspective view of the base section of FIG. 7A.
Figure 8A:
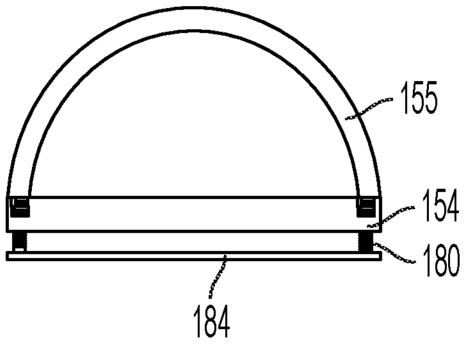
FIG. 8A is a side view of a base section of the lifting system of FIG. 5A in a storage configuration.
Figure 8B:
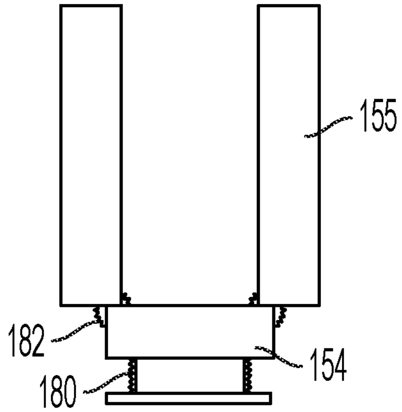
FIG. 8B is a front view of the base section of FIG. 8A.
Figure 8C:
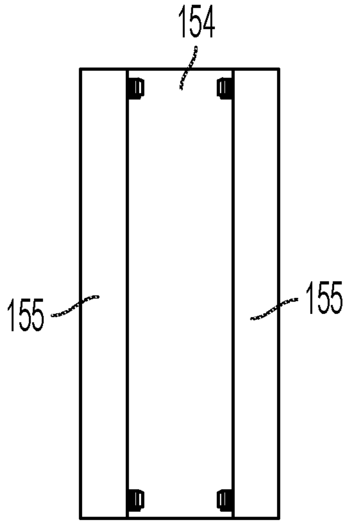
FIG. 8C is a top view of the base section of FIG. 8A.
Figure 8D:
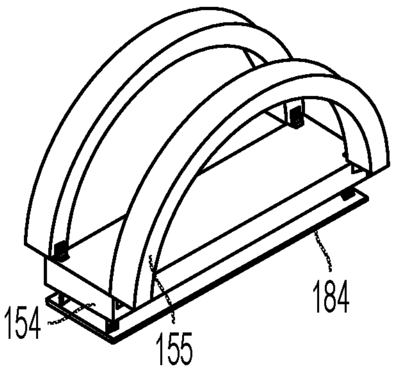
FIG. 8D is a perspective view of the base section of FIG. 8A.

Referring to FIG. 5A, there is shown generally depicted at 112 an alternative load connecting apparatus designed to reversibly couple to the lift connector apparatus 14 described in FIGS. 4A to 4D above.

The load connector apparatus 112 is similar to the load connecting apparatus 12 described in FIGS. 1A and 3A to 3D, however, the load connector apparatus 112 does not have a cylindrical chamber 17 to support the studs and accommodate the lift connector apparatus 14.

The load connector apparatus 112 has a frame 150. The frame 150 has two vertical supports 152 connected to a base section 154 at a lower end 152*a* of the supports 152. The frame design of the load connector apparatus 112 allows for a more compact storing profile when not in use, than the load connector apparatus 12. The frame 150 may fold flat.

Studs 130 are connected to the vertical supports 152 by stud supports 151. The studs 130 face one another and are dimensioned to accommodate the lift connector apparatus 14 between the studs 130 and allow the studs 130 to be located in the tracks 42 of the indexer mechanism 40 of the lift connector apparatus 14. The load connector apparatus 112 is load bearing. The frame 112, and vertical supports 152 must be strong enough to take the weight of the load and torque applied.

The upper ends 152*b* of the supports 152 have apertures 156 which are configured to receive rods 158 connected to torque ring 120 and allow the torque ring to pivot about the longitudinal axis of the rods 158 shown as "R" in FIG. 5A. The torque ring is not fixed onto the main structure. The torque ring may pivot between an operational position which is substantially perpendicular to the vertical supports and a storage position which is substantially parallel to the vertical supports.

Figure 11C:
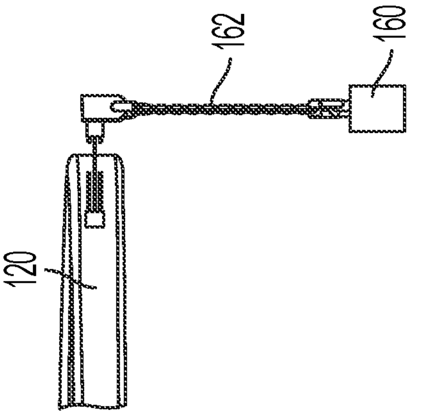
FIG. 11C is another perspective view of the load connector apparatus balance system of FIG. 11A.
Figure 11B:
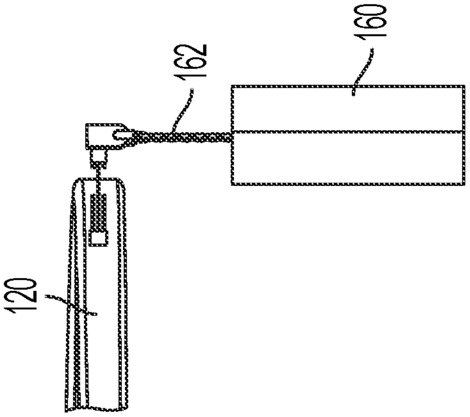
FIG. 11B is another perspective view of the load connector apparatus balance system of FIG. 11A.
Figure 11A:
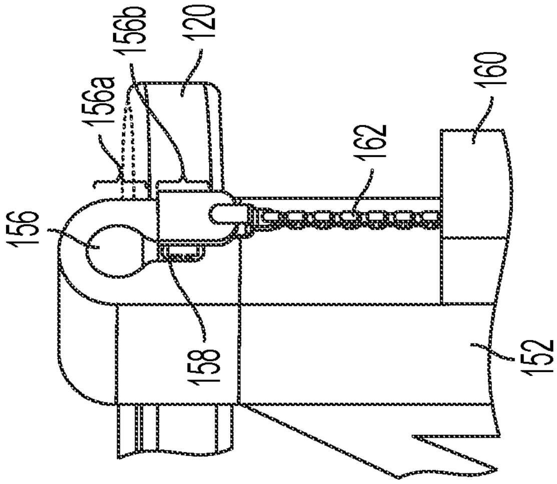
FIG. 11A is a perspective view of a load connector apparatus balance system, according to certain embodiments of the present invention.

As shown in FIG. 11A the aperture 156 has a generally key slot shape with an upper section 156*a* and a lower section 156*b*. The upper section 156*a* is wider than the lower section 156*b*. The rod 158 has a generally square cross section and when the rod 158 is located in the upper section 156*a* the rod is free to rotate about axis "R". However, when the rod 158 is located in the narrower lower section 156*b* of the aperture 156 the rod is unable to rotate and is locked in position.

The aperture shape allows the rod to rotate when the rod is located in the wider upper part of the aperture in an elevated position. The rod and connected torque ring are held in a rotationally fixed position when the rod is in a resting position and located in the lower section of the key shaped aperture. This allows the torque ring to rotate between a vertical position substantially parallel with the vertical supports 152 when in a storage condition and a rigid horizontal position substantially perpendicular with the vertical supports 152 when in use.

Figure 2A:
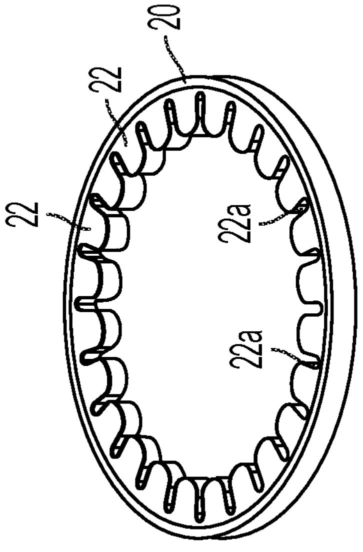
FIG. 2A is a perspective view of a torque ring of the lifting system of FIG. 1A.
Figure 2B:
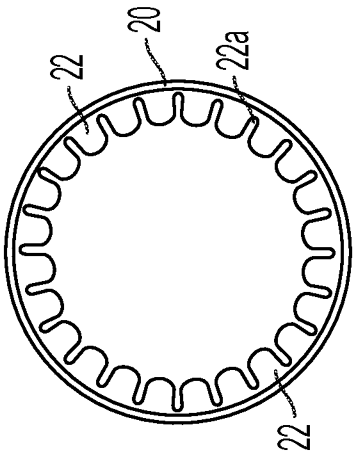
FIG. 2B is a top view of the torque ring of FIG. 2B.

The torque ring 120 is similar to torque ring 20 described in FIGS. 1A, 2A and 2B and will be understood from the description of FIGS. 1A, 2A and 2B. The torque ring 120 has a plurality of teeth 122 on the inner surface of the ring designed to engage the lift connector apparatus 14. In some examples, the ring has a diameter of 400 mm with teeth 122 having a rounded profile. However, it will be appreciated that a variety of teeth designs, a different number of teeth and ring diameters may be used.

As shown in FIGS. 11B and 11C, weights 160 are attached by chains 162 to either ends 158*a* of the rods 158. The weights 160 act as a balancing aid to bring the torque ring to an operational position which is substantially horizontal and is substantially perpendicular with the vertical supports 152. Alternatively the torque ring 120 may be a weighted ring to allow gravity to act solely on the rods 158 to bring the torque ring 120 back to the operational position and lock it in the operational position by maintaining the rods in the lower part of the key-shaped aperture 156.

In the above examples, the rods 158 are connected to the torque ring 120 and provide support to the torque ring 158. However, it will be appreciated that a different number of rods or rods designs may be used to support the torque ring.

In alternative embodiments, the torque ring 120 may be supported by a single rod or pin which passes through an aperture on one vertical support to allow the torque ring to pivot and a stop member to prevent rotation beyond a certain point.

The vertical supports may alternatively have a recess which accommodates the weights 160. The recess may provide a channel in which the weight moves up and down as the torque ring is rotated between a storage position where the plane of the torque ring is substantially vertical and is substantially parallel with the vertical supports and an operational position where the plane of the torque ring is substantially horizontal and is substantially perpendicular with the vertical supports.

The supports have eyelets 170 on the outer surface of the vertical supports 152 which allow for a shackle or sling connection to be attached to allow the load connector apparatus 112 to be connected to a load.

The base of load connector apparatus 112 consists of a central block section 154 and two semi-circular base supports 155 which act as balancing aids.

In some examples, the semi-circular base supports are attached to the central block section through a rack 180 and pinion 182 system which is connected to a plate 184.

As shown in FIG. 8A to 8D, the load connector apparatus 112 is set on top of a load or ground (when not in use). The plate 184 pushes the racks up, thus rotating the pinions in the opposite direction, causing the balancing aids to lower. When the load connector apparatus 112 is picked up by the lifting device, the weight of the plate 184 pulls in the opposite direction from the lifting force, thus lowering the racks, allowing the pinions to rotate back up, this in turn moves the balancing aids to a substantially vertical position.

As an alternative to positioning the eyelets on the frame, a rigid master link could be located at the base to hold the eyelets.

Figure 9A:
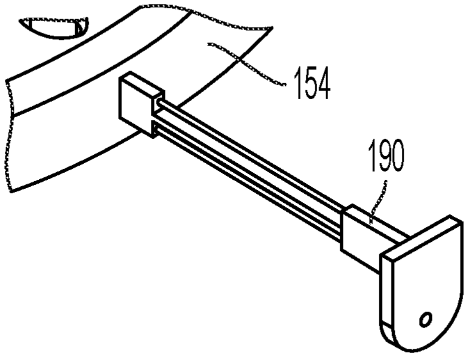
FIG. 9A is a perspective view of a stabiliser for the base section of FIG. 7A.
Figure 9B:
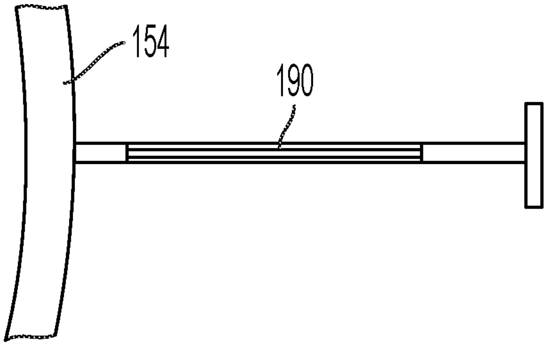
FIG. 9B is a top view of the stabiliser of FIG. 9A.
Figure 9C:
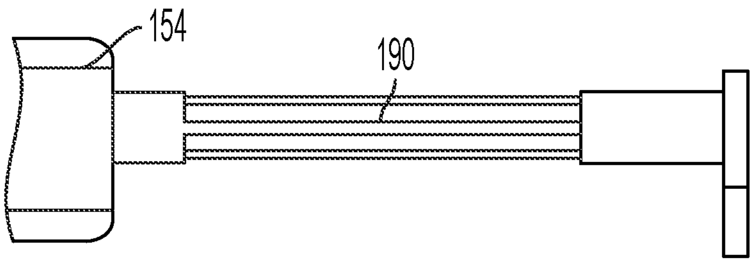
FIG. 9C is a side view of the stabiliser of FIG. 9A.
Figure 10B:
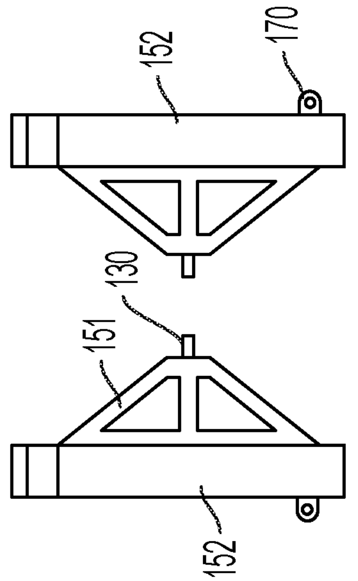
FIG. 10B is a side view of the stud support member of FIG. 10A.
Figure 10A:
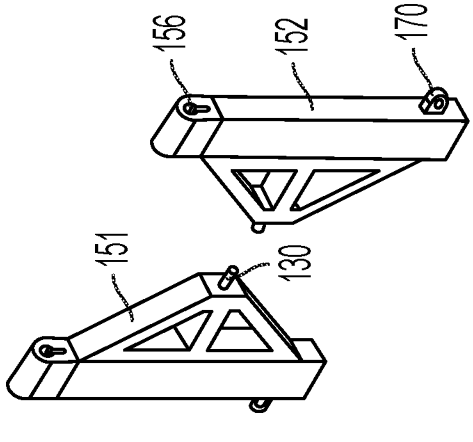
FIG. 10A is a perspective view of a stud support member of the system of FIG. 5A.

As an alternative to the semi-spherical supports, legs 190 could extend from the bases as shown in FIGS. 9A to 9C to help stabilise the load connector apparatus 112.

Instead of having a rack and pinion to activate the stabilisers, a pressurized plate could be used to do so. A separate way of allowing the legs to fold up and release would be a simple hinge to which the legs pivot around and lower and lock when required.

In use, the load connector apparatus 112 is connected to a load to be moved via slings attached to lifting eyelets 170. The lift connector apparatus 14 is connected to a crane by upper section 32*a*.

The crane operator maneuvers a lifting hook connected to the lift connector apparatus 14 such that the lower end 31 passes through the torque ring 120. The torque ring creates a target for the crane operator to aim for with the lift connector apparatus.

As the lift connector apparatus 14 is lowered into torque ring 120 of the load connector apparatus 112, the fins 34 engage the grooves 122*a* between the teeth 122 in the torque ring 120 which assists in guiding the lift connector apparatus 14 into the correct operational position and aids the indexer mechanism 40 on the lift connector apparatus 14 to approach the studs 130 on the stud support in the correct orientation. The teeth 122 keep the lift connector apparatus 14 in a substantial vertical orientation which assists the studs 130 to connect with the indexer mechanism 40. Relative movement of the lift connector apparatus 14 relative to the load connector apparatus 112 determines which track in indexer mechanism the studs 130 enter.

Under the effects of gravity, the weight of the lift connector apparatus 14 moves the lift connector apparatus in a downward direction shown as arrow “A” in FIG. 4C until the studs 30 enter the track inlets 43 in the indexer mechanism 40.

Under the weight of the lift connector apparatus 14, the studs 130 travel along track 45*a* in the indexer mechanism 40 and contact inclined shoulder 45 in the track and the studs 130 are directed into upper slot 46. This action rotates the lower section 32*a* of the lift connector apparatus 14 relative to the upper section 32*b*. As the clutch mechanism 60 is in the open clutch condition, the upper section 32*a* and lower section 32*b* are free to rotate independently of one another.

When the studs 130 are in the upper slot 46 of the indexer mechanism, the lift connector apparatus 14 cannot be lowered any further in direction “A”. The crane operator moves the lift connector apparatus 14 in an upward direction shown as arrow “B” in FIG. 4C. This upward movement or jolt results in the stud 130 travelling along track 47 in the indexer mechanism 40 and contacting inclined shoulder 48 in the track which directs the studs 130 into load bearing slot 44. When the studs 130 are located in the load bearing slots 44 they are constrained against rotation by shoulders 49 and 50 and the downward force “F” acting on the studs by the load. The lift connector apparatus 14 and load connector apparatus 112 are reversibly coupled together.

As the indexer mechanism 40 of the lower section of the lift connector apparatus is maneuvered to position the studs 130 in load bearing slot 44, the fins 34 on the upper section are positioned in grooves 122*a* between teeth 122 on the torque ring 120. The lower section 32*b* is able to rotate about the longitudinal axis relative to the upper section by bearing 35.

When the studs 130 are positioned in load bearing slot 44 the fins 34 are securely positioned in grooves 122*a* between teeth 122 on the torque ring 120. The grooves between the teeth rotationally couple the fins, the upper section 32*a*, and the torque ring.

A further lifting force is applied by the crane shown as arrow "B" in FIG. 4C to overcome the spring force of the compression spring 62 in the clutch mechanism 60. The upper section 32*a* is moved upwards in the direction shown as arrow "U" in FIG. 4D. This brings the teeth 67*b* of the lower clutch member 66*b* in contact with the teeth 67*a* of the upper clutch member 66*a* where they mesh. The clutch mechanism is moved to a closed clutch condition and the upper section 32*a* and the lower section 32*b* of the lift connector apparatus are rotationally coupled.

During a lifting operation, any rotational torque applied to the lifting hook about the longitudinal axis "L" as shown in FIG. 1A is transferred through the upper section 32*a* of the lift connector apparatus through the fins 34 to the teeth 122 of torque ring 120 and applied to the load. The teeth on the inside of the torque ring transfer the torque from the fins to torque ring and to the load via the slings. This allows even the smallest degree of rotation applied by the lifting device to be transfer to the load ensuring accurate positioning of the load. As the torque is substantially applied to the torque ring minimal torque may be transferred or applied to the indexer mechanism which avoids damage to the studs or accidental release of studs from the indexer mechanism.

Also, during a lifting operation any rotational torque applied to the load about the longitudinal axis "L" as shown in FIG. 1A is transferred through load connector apparatus to the torque ring 120 and via the torque ring teeth 122 to the fins 34 of the upper section of the lift connector apparatus. This allows torque acting on the load to be accurately and effectively transferred to the lifting apparatus.

This enables the lift connector apparatus upper section 32*a* and fin members 34 to transfer torque to the load connector apparatus 12 safely, securely, and accurately.

To disconnect the lift connector apparatus 14 and load connector apparatus 112, the load is lowered to contact the ground or a surface capable of supporting the load. As the downward force provided by the weight of the load is reduced, the spring force of the compression spring 62 in the clutch mechanism 60 separates the lower clutch member 66*b* and the upper clutch member 66*a* to move the clutch to an open clutch condition as shown in FIG. 4D. The upper section 32*a* is free to rotate about shaft 61. The upper section 32*a* and lower section 32*b* may rotate independently from one another.

The load force acting on the studs 130 in load bearing slot 44 from the weight of the load is also reduced, and further upward movement in direction "B" of the lift connector apparatus 14 results in the studs 130 moving out of the load bearing slot 44. The lower section 32*b* rotates relative to the upper section about longitudinal axis "L" as the studs 130 travel along the track 45*a* to the track outlet 43. The lift connector apparatus 14 is disconnected from the load connector apparatus.

Figure 12:
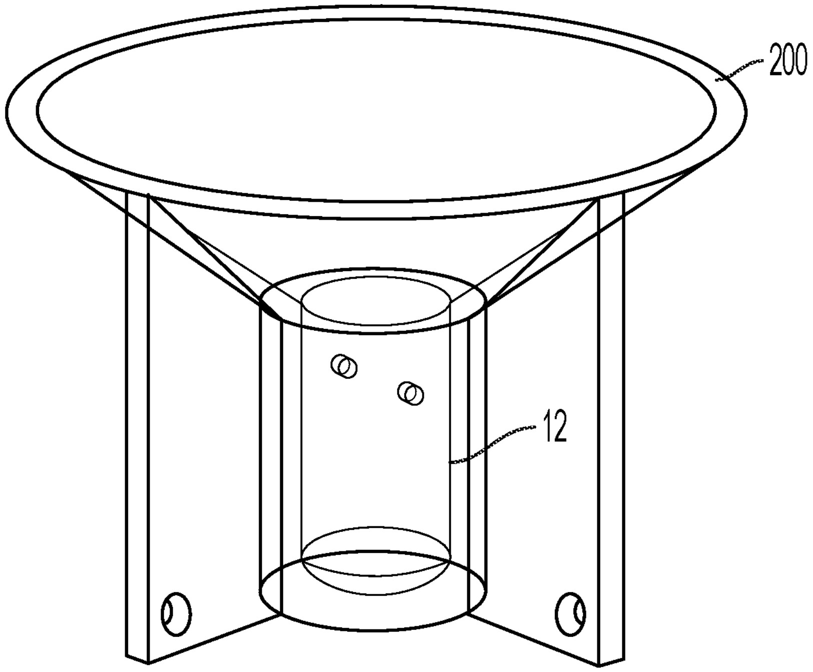
FIG. 12 is a perspective view of a load connector apparatus with an outer funnel, according to certain embodiments of the present invention.

FIG. 12 shows a funnel 200 which may be incorporated into the design of the load connector apparatus or a housing integral or connected to the load connector apparatus. The funnel is configured to guide or direct the lift connector apparatus 14 into at least a portion of the load connector apparatus.

Although the described embodiments relate to the indexer mechanism being located on the lift connector apparatus and the corresponding studs located on the load connector apparatus, it will be appreciated that the indexer mechanism may be located on the load connector apparatus and the corresponding studs may be located on the lift connector apparatus.

Certain embodiments of the invention provide a system and method for lifting a load, which comprises a first connector member connectable to a load to be lifted and a second connector member comprising a first section and a second section. The first section is connectable to a lifting device and the second section is configured to reversibly couple to the first connector member.

Some embodiments of the present invention provide an improved system and method for connecting and disconnecting a lifting device to a load and controlling the lifting and handling of the load.

It allows the user to remotely connect, disconnect, lift, and accurately control the orientation of the load. The lifting device can be remotely and reliably attached to the load and torque or mechanical stresses during the orientation or handling of the load are minimised on the latching mechanism. Therefore, the load is reliably connected, and damage or accidental disconnection of the load is mitigated.

The apparatus and method may be safer than previous systems which require on-site workers manually connecting the load to the lifting device and controlling its orientation by guide ropes or working in close proximity to the suspended load. By providing a system that enables remote connection and disconnection of a load and minimises stresses and strains on the connection, The apparatus and method mitigates potential damage and/or personnel injuries.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

Furthermore, relative terms such as, "lower", "upper, "up", "down", "above", "below" and the like are used herein to indicate directions and locations as they apply to the appended drawings and will not be construed as limiting the invention and features thereof to particular arrangements or orientations. Likewise, the term "outlet" shall be construed as being an opening which, dependent on the direction of the movement of a fluid and may also serve as an "inlet", and vice versa.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention herein intended.

What is claimed is:

1. A system for connecting a lifting device to a load to be lifted; the system comprising:

a first connector member, the first connector member comprising at least one pin; and a second connector member, the second connector member comprising an indexer mechanism defining a track;

wherein at least a portion of the at least one pin is receivable in and moveable out of the track;

wherein the pin is movable along the track between a lock position and an unlock position; and wherein the first connector member is movable relative to the second connector member via the pin and the indexer mechanism in response to a first series of longitudinal movements of the first or second connector members.

2. The system of claim 1, wherein the pin is located on an inner surface of a body of the first connector member, and the indexer mechanism is located on an outer surface of a body of the second connector member.

3. The system of claim 1, wherein the pin is movable along the track from the lock position to the unlock position due to a gravitational force.

4. The system of claim 1, wherein the pin is located in a load bearing slot of the track in the lock position.

5. The system of claim 1, wherein the track comprises a plurality of load bearing slots and a plurality of track openings.

6. The system of claim 1, wherein the second connector member is insertable into the first connector member.

7. The system of claim 1, wherein the indexer mechanism is positioned in a first section of the second connector member.

8. The system of claim 7, wherein the first section and a second section of the second connector member are independently rotatable.

9. The system of claim 7, wherein the second connector member further comprises a clutch mechanism that rotationally couples the first section and a second section of the second connector member in a first state and permits independent rotation of the first section and the second section in a second state; and wherein the clutch mechanism comprises:

a shaft;

an upper clutch portion located at an upper end of the shaft and comprising a plurality of teeth;

a lower clutch portion located at a lower end of the shaft and comprising a plurality of teeth; and a spring positioned around the shaft and extending between the upper clutch portion and the lower clutch portion;

wherein the upper clutch portion is engageable with the lower clutch portion in the second state.

10. A method of connecting a load to a lifting device and lifting the load, the method comprising:

coupling a first connector member or a second connector member to the load;

coupling the other of the first connector member or the second connector member to the lifting device, the first connector member comprising at least one pin, and the second connector member comprising an indexer mechanism defining a track;

inserting the at least one pin into the track;

moving at least one portion of the second connector member relative to at least one portion of the first connector member by moving the first connector member, the second connector member, or both, in a first series of longitudinal movements relative to each other; and lifting the first connector member, the load, and the second connector member.

11. The method of claim 10, wherein moving the at least one portion of the second connector member relative to the at least one portion of the first connector member comprises lowering the at least one portion of the second connector member into or around the at least one portion of the first connector member.

12. The method of claim 10, further comprising moving the at least one pin along the track from a lock position to an unlock position using a gravitational force.

13. The method of claim 10, further comprising moving the second connector member in the first series of longitudinal movements to position the pin in a load bearing slot of the track.

14. The method of claim 10, wherein the second connector member comprises a first section and a second section that are independently rotatable in a first state and are rotationally coupled in a second state, and the method further comprises applying a lifting force to the second connector member to move the first section and the second section to the second state.

15. The method of claim 10, wherein the track comprises a plurality of load bearing slots and a plurality of track openings.

16. A method of connecting a load to a lifting device, lifting the load, and disconnecting the load from the lifting device, the method comprising:

coupling a first connector member or a second connector member to the load at a first location;

coupling the other of the first connector member or the second connector member to the lifting device, the first connector member comprising at least one pin, and the second connector member comprising an indexer mechanism defining a track;

inserting the at least one pin into the track;

coupling at least one portion of the second connector member to at least one portion of the first connector member by moving the first connector member, the second connector member, or both, in a first series of longitudinal movements relative to each other to reversibly couple the first connector member and the second connector member;

lifting the first connector member, the load, and the second connector member;

moving the load to a second location;

removing the at least one pin from the track; and decoupling and separating the at least one portion of the first connector member and the at least one portion of the second connector member by moving the second connector member in a second series of longitudinal movements relative to the first connector member.

17. The method of claim 16, wherein decoupling the at least one portion of the first connector member and the at least one portion of the second connector member comprises lowering the first connector member, the load, and the second connector member and/or supporting the load on a surface.

18. The method of claim 16, further comprising decoupling the first connector member or the second connector member from the load.

19. The method of claim 16, wherein the first series and the second series of longitudinal movements comprise a predetermined sequence of downward and upward longitudinal movements of the second connector member relative to the first connector member.

20. The method of claim 16, wherein the track comprises a plurality of load bearing slots and a plurality of track openings.

21. A method of decoupling a load from a lifting system, the method comprising:

moving a first connector member or a second connector member in a plurality of longitudinal movements relative to the other, wherein the first connector member comprises at least one pin and the second connector member comprises a track adapted to be removably coupled with the at least one pin, thereby removing the at least one pin from the track.

* * * * *